United States Patent
Konttinen (10) Patent No.: US 9,977,783 B2
(45) Date of Patent: May 22, 2018

(54) SYSTEMS, METHODS, DEVICES, AND COMPUTER PROGRAM PRODUCTS FOR ARRANGING A USER'S MEDIA FILES

(71) Applicant: NOKIA TECHNOLOGIES OY, Espoo (FI)

(72) Inventor: Hannu Konttinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days. days.

(21) Appl. No.: 15/426,522

(22) Filed: Feb. 7, 2017

(65) Prior Publication Data

US 2017/0147574 A1 May 25, 2017

Related U.S. Application Data

(63) Continuation of application No. 11/695,851, filed on Apr. 3, 2007, now abandoned.

(51) Int. Cl.
   G06F 3/048 (2013.01)
   G06F 17/30 (2006.01)
   H04L 29/08 (2006.01)

(52) U.S. Cl.
   CPC .. *G06F 17/30029* (2013.01); *G06F 17/30053* (2013.01); *H04L 67/02* (2013.01); *H04L 67/306* (2013.01)

(58) Field of Classification Search
   CPC ......... G06F 17/30743; G06F 17/30029; G06F 17/30053
   USPC ......... 715/747, 731, 733, 738, 811; 709/219
   See application file for complete search history.

(56) References Cited

U.S. PATENT DOCUMENTS

| 6,526,411 | B1 | 2/2003 | Ward |
| 7,028,082 | B1 | 4/2006 | Rosenberg et al. |
| 7,076,561 | B1 | 7/2006 | Rosenberg et al. |
| 7,325,043 | B1 | 1/2008 | Rosenberg et al. |
| 2004/0073924 | A1 | 4/2004 | Pendakur |

(Continued)

FOREIGN PATENT DOCUMENTS

| JP | 2005-293195 | 10/2005 |
| WO | WO 2004/107757 A | 12/2004 |

OTHER PUBLICATIONS

"Review of iTunes Celebrity Playlists—Death Cab for Cutie". Jan. 16, 2006. http://musicforants.com/blog/review-of-itunes-celebrity-playlists-death-cab-for-cutie.
International Search Report for PCT Application No. PCT/IB2008/050378 dated Jun. 18, 2008.

(Continued)

*Primary Examiner* — Andrey Belousov
(74) *Attorney, Agent, or Firm* — Alston & Bird LLP (57) ABSTRACT

Systems, methods, devices, and computer program products are provided for generating an arrangement of a user's media files. For example, a user of a first device may use the first device to access a second device. The second device may provide the user with the option to select a profile stored in the second device. The user may then use the first device to communicate, to the second device, a selection of a profile along with a list of music stored in the first device. The second device may then generate a playlist using music identified in the list received from the first device. The second device may generate the playlist based on the selected profile. The second device may then communicate the playlist back to the first device. The profile used by the second device to generate the playlist may be based on a particular theme or on the music preferences of a particular person.

18 Claims, 5 Drawing Sheets

(56) References Cited

U.S. PATENT DOCUMENTS

| | | | |
|---|---|---|---|
| 2005/0038819 A1 | 2/2005 | Hicken et al. | |
| 2005/0197961 A1 | 9/2005 | Miller et al. | |
| 2005/0210507 A1 | 9/2005 | Hawkins et al. | |
| 2006/0143236 A1 | 6/2006 | Wu | |
| 2006/0265421 A1* | 11/2006 | Ranasinghe | G06F 17/30743 |
| 2007/0012163 A1 | 1/2007 | Ijichi | |
| 2007/0256021 A1 | 11/2007 | Prager et al. | |
| 2009/0055759 A1* | 2/2009 | Svendsen | G11B 27/00 715/764 |

OTHER PUBLICATIONS

Written Opinion of the International Searching Authority for International Application No. PCTIB2008/050378 dated Jun. 18, 2008.
Examination Report for Indian Application No. 6453/CHEN/2009 dated Feb. 20, 2015.
First Office Action for Chinese Patent Application No. 200880010309.1 dated Apr. 26, 2011.
iLike™; iLike, Inc.; 6 pages; available at <http://ilike.com> (visited Apr. 3, 2007).
Music recommendation system; ProjectIdeas: Music recommendation system; 2 pages; available at <http://wiki.cs.uiuc.edu/ProjectIdeas/Music+recommendation+system> (visited Apr. 3, 2007).
Office Action for Korean Application No. 2009-7022944 dated Mar. 10, 2011.
Pandora®—Pandora Internet Radio; Pandora Media, Inc.; 5 pages; available at <http://www.pandora.com> (visited Apr. 3, 2007).
Rejection Decision for Chinese Patent Application No. 200880010309.1 dated Nov. 23, 2011.
Office Action from corresponding European Patent Application No. 08709957.8 dated May 4, 2010.
Brief Communication concerning Oral Proceedings from corresponding European Patent Application No. 08709957.8 dated Mar. 18, 2013.
Summons to Attend Oral Proceedings from corresponding European Patent Application No. 08709957.8 dated Dec. 7, 2012.

* cited by examiner

SYSTEMS, METHODS, DEVICES, AND COMPUTER PROGRAM PRODUCTS FOR ARRANGING A USER'S MEDIA FILES

CROSS REFERENCE TO RELATED APPLICATION

This application is a continuation of and claims priority to U.S. application Ser. No. 11/695,851, filed Apr. 3, 2007, entitled, "Systems, Methods, Devices, And Computer Program Products For Arranging A Users Media Files," the entire contents of which are hereby incorporated by reference.

FIELD OF EMBODIMENTS OF THE INVENTION

Embodiments of the invention relate generally to systems, methods, and computer program products configured to generate an arrangement of a user's media files based on a selected profile. More particularly, embodiments of the invention relate to a system where a user can send a list of media files to a server and, in return, receive a list of at least some of these media files arranged according to a selected profile.

BACKGROUND OF EMBODIMENTS OF THE INVENTION

Many people have accumulated large collections of electronic media files, such as digital music files. A problem associated with having so many music files is that a user may have a difficult time selecting which music files to play. A user may have more music files than he or she can easily manage and may resort to picking the same songs or combinations of songs over and over again, which can become boring.

In response to this problem, many electronic devices that are configured to play music files have a "shuffle" option that randomly plays music files stored on the electronic device. Playing songs at random, however, has other problems. For example, a user may have a wide variety of songs stored on an electronic device, and randomly selecting songs may lead to selections of songs from different genres that do not fit well together or do not correspond to the type of music that the user wants to listen to at that moment.

Many applications allow a user to create and save playlists, which allows a user to select certain songs and arrange them into a particular playback order. Thus, different user's using the same device can each create a playlist of their favorite songs or users can create different playlists that correspond to different genres of music or different situations or moods. Creating playlists, however, can be time consuming. Furthermore, if a user is creating a playlist of songs to play at a party or an event, a user may not know which songs are currently popular with the attendees of the party or event.

BRIEF SUMMARY OF EMBODIMENTS OF THE INVENTION

In light of the foregoing background, exemplary embodiments of the present invention provide systems, methods, devices, and computer program products configured to automatically generate an arrangement of a user's media files based on a selected profile. For example, a user of a first device may use the first device to access a second device. The second device may provide the user with the option to select a profile stored in the second device. The user may then use the first device to communicate, to the second device, a selection of a profile along with a list of music stored in the first device. The second device may then generate a playlist using music identified in the list received from the first device. The second device may generate the playlist based on the selected profile. The second device may then communicate the playlist back to the first device. The profile used by the second device to generate the playlist may be based on a particular theme or on the music preferences of a particular person.

In more general terms, embodiments of the present invention provide for an apparatus having a communication interface configured to receive a first electronic communication from a first device, where the first electronic communication includes an identification of a plurality of media files. The apparatus further includes a processing device configured to generate an arrangement of select media files from the plurality of media files accessible by the first device based on a predefined profile. The processing device is then configured to use the communication interface to communicate a second electronic communication to the first device, where the second electronic communication includes the arrangement.

In one embodiment, the processing device is configured to generate an arrangement in accordance with any one of a plurality of profiles. In such an embodiment, the first electronic communication may further include an indication of a selected profile from the plurality of profiles. In this regard, the processing device may be configured to use the communication interface to provide the first device with a plurality of selectable profiles. The communication interface may then be configured to receive, from the first device, a selection of a profile from the plurality of selectable profiles. The processing device may then be configured to generate the arrangement based on the selected profile.

In an embodiment, a plurality of media files are associated with the profile used to generate the arrangement. In such an embodiment, the processing device may be configured to compare the plurality of media files accessible by the first device to the plurality of media files associated with the profile. In another embodiment, the processing device may be configured to compare metadata associated with a media file identified by the plurality of media files accessible by the first device to metadata associated with the profile used by the processing device to generate the arrangement.

The processing device may also be configured to generate the arrangement based on a predefined profile by: (1) determining attributes of the media files identified by the plurality of media files accessible by first device; and (2) comparing the attributes of the media files in the plurality of media files to attributes associated with the profile. For example, the processing device may be configured to determine attributes of the media files identified by the plurality of media files by comparing the media files identified by the plurality of media files to predefined attributes associated with each of a plurality of different media files.

In an exemplary embodiment, the communication device comprises a server, such as a web server, and the first device comprises a mobile terminal. In one embodiment, the profile used by the processing device to generate the arrangement is based on arrangement preferences of a person other than the user of the first device, such as a celebrity.

In an exemplary embodiment, the media files are music files and the arrangement includes a playlist. Where the plurality of media files comprises a plurality of music files, the processing device may be configured to generate the arrangement by comparing the plurality of music files and metadata associated with the music files to music artists, music albums, music titles, or music attributes associated with a profile.

In one embodiment, the processor is configured to select a plurality of media files from the plurality of media files accessible by the first device based on the profile, and the processor is further configured to order the selected plurality of media files based on the profile. In one embodiment, the apparatus includes a memory device having at least one profile stored therein.

Embodiments of the present invention further provide a method comprising: (1) receiving a first electronic communication from a first device, the electronic communication comprising an identification of a plurality of media files accessible by the first device; (2) generating an arrangement of select media files from the plurality of media files based on a predefined profile; and (3) communicating a second electronic communication to the first device, the second electronic communication comprising the arrangement. The first electronic communication may further include an indication of the predefined profile used to generate the arrangement. In this regard, the method may further involve: providing the first device with a plurality of selectable predefined profiles; receiving, from the first device, a selection of a predefined profile from the plurality of selectable profiles; and using the selected predefined profile to generate the arrangement.

In one embodiment, generating an arrangement includes comparing the plurality of media files accessible by the first device to a plurality of media files associated with the predefined profile. In another embodiment, generating an arrangement includes: determining attributes of the media files identified by the plurality of media files accessible by the first device; and comparing the attributes of the media files in the plurality of media files to attributes associated with the predefined profile. In such an embodiment, determining attributes of the media files identified by the plurality of media files may involve comparing the media files identified by the plurality of media files to predefined attributes associated with each of a plurality of different media files. For example, the plurality of media files accessible by the first device may be compared to a database, the database having attributes assigned to each of a plurality of different media files. In one embodiment, the predefined profile used to generate the arrangement is based on the arrangement preferences of a person other than the user of the first device, such as a celebrity.

In one embodiment, the predefined profile is stored in the memory of a second device, and the second device may include a web server. The first device may include a mobile terminal. In an exemplary embodiment, the media files are music files and the arrangement is a playlist. Where the plurality of media files includes a plurality of music files, the method may involve comparing the plurality of music files and metadata associated with the music files to music artists, music albums, music titles, or music attributes associated with the predefined profile.

In one embodiment of the method, generating an arrangement involves selecting a plurality of media files from the plurality of media files received from the first device based on the predefined profile, and ordering the selected plurality of media files based on the predefined profile.

Embodiments of the present invention further provide a computer program product. The computer program product may comprise at least one computer-readable storage medium having computer-readable program code logic stored therein. The computer-readable program code logic may include: (1) a first code logic configured for receiving a first communication from a first device, the communication comprising an identification of a plurality of media files accessible by the first device; (2) a second code logic configured for generating an arrangement of select media files from the plurality of media files based on a predefined profile; and (3) a third code logic configured for communicating a second communication to the first device, the second communication comprising the arrangement.

The computer program product may further include: code logic configured for providing the first device with a plurality of selectable predefined profiles; and code logic configured for receiving, from the first device, a selection of a predefined profile from the plurality of selectable profiles, wherein the second code logic is configured to generate the arrangement based on the selected predefined profile.

In one embodiment, the second code logic is further configured for comparing the plurality of media files accessible by the first device to a plurality of media files associated with the predefined profile. The second code logic may be further configured to determine attributes of the media files identified by the plurality of media files accessible by the first device, and may then compare the attributes of the media files identified in the plurality of media files to attributes associated with the predefined profile. For example, the second code logic may determine attributes of the media files identified by the plurality of media files by comparing the media files identified by the list of media files to predefined attributes associated with each of a plurality of different media files.

In an exemplary embodiment, the predefined profile is stored in the memory of a second device. In an exemplary embodiment, the media files are music files and the arrangement is a playlist.

Embodiments of the present invention further provide a method, which may, in one embodiment, be executed at a first device. Such a method may include (1) accessing a second device; (2) receiving, from the second device, an option to select a profile from a plurality of profiles; (3) communicating a selection of a selected profile from the plurality of profiles; (4) identifying a plurality of media files to the second device; and (5) receiving, from the second device, an arrangement of at least some of the identified media files.

In one embodiment, where the plurality of media files includes a plurality of audio files stored in a memory of the first device, and where the arrangement includes a playlist, the method may further include playing the audio files on the first device in accordance with the playlist received from the second device.

Embodiments of the present invention further provide an apparatus having a communication interface configured for communicating with a second apparatus, and a processor operatively coupled to the communication interface. The processor may be configured to (1) receive, from the second apparatus, an option to select a profile from a plurality of profiles; (2) use the communication interface to communicate, to the second apparatus, a selection of a selected profile from the plurality of profiles; (3) use the communication interface to communicate an identification of a plurality of media files to the second apparatus; and (4) receive, from the second apparatus, an arrangement of at least some of the plurality of media files. In one embodiment, the apparatus further includes a memory device and a user output device, both operatively coupled to the processor. In an exemplary embodiment, the plurality of media files includes a plurality of audio files stored in the memory device and the arrangement received from the second apparatus includes a playlist. In such an embodiment, the processor may further be configured to use the user output device to play the audio files in accordance with the playlist received from the second apparatus.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF EMBODIMENTS OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
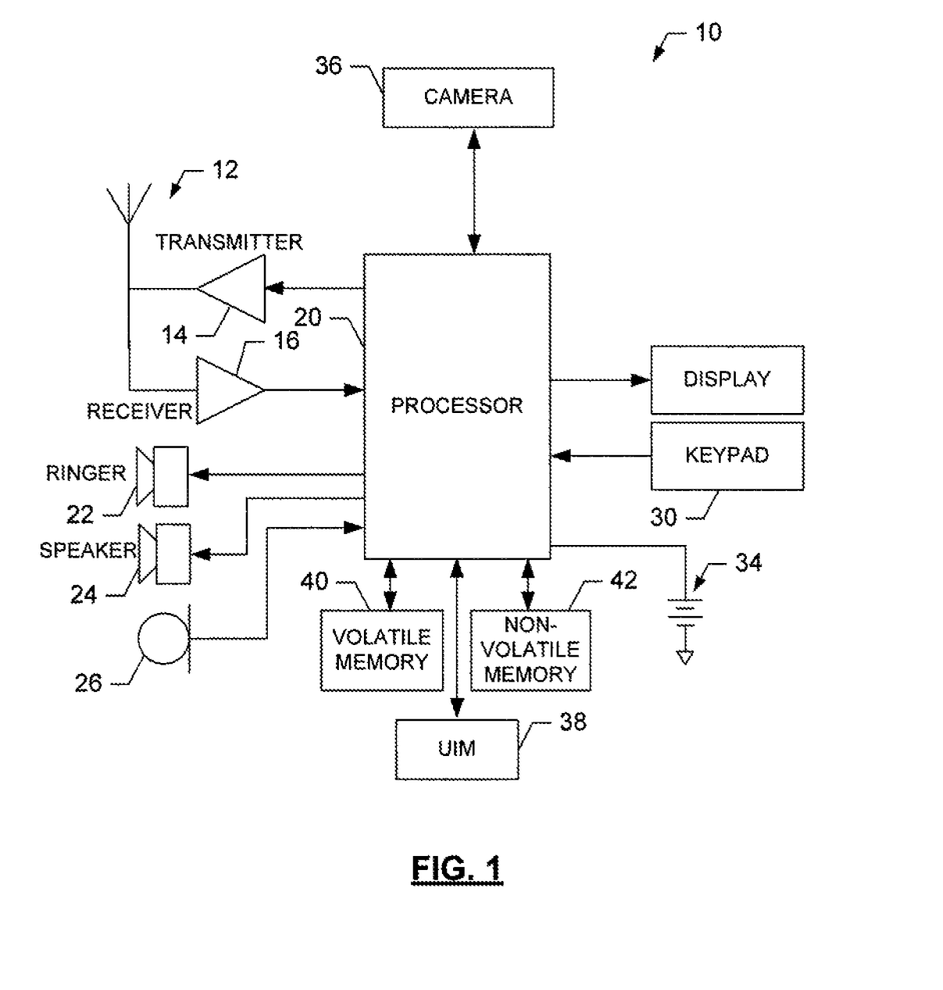
FIG. 1 is a schematic block diagram of a mobile terminal in accordance with an exemplary embodiment of the present invention.

FIG. 1 illustrates a block diagram of an electronic device, and specifically a mobile terminal 10, that may benefit from embodiments of the present invention. While several embodiments of the mobile terminal 10 are illustrated and will be hereinafter described for purposes of example, other types of electronic devices, such as digital cameras, portable digital assistants (PDAs), pagers, mobile televisions, computers, laptop computers, and other types of systems that manipulate and/or store data files, can readily employ embodiments of the present invention. Such devices may or may not be mobile.

The mobile terminal 10 includes a communication interface comprising an antenna 12 in operable communication with a transmitter 14 and a receiver 16. The mobile terminal 10 further includes a processor 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the processor 20 includes circuitry required for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 can additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera 36 in communication with the processor 20. The camera 36 may be any means for capturing an image for storage, display or transmission. For example, the camera 36 may include a digital camera capable of forming a digital image file from a captured image. As such, the camera 36 includes all hardware, such as a lens or other optical device, and software necessary for creating a digital image file from a captured image. Alternatively, the camera 36 may include only the hardware needed to view an image, while a memory device of the mobile terminal 10 stores instructions for execution by the processor 20 in the form of software necessary to create a digital image file from a captured image. In an exemplary embodiment, the camera 36 may further include a processing element such as a co-processor which assists the processor 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
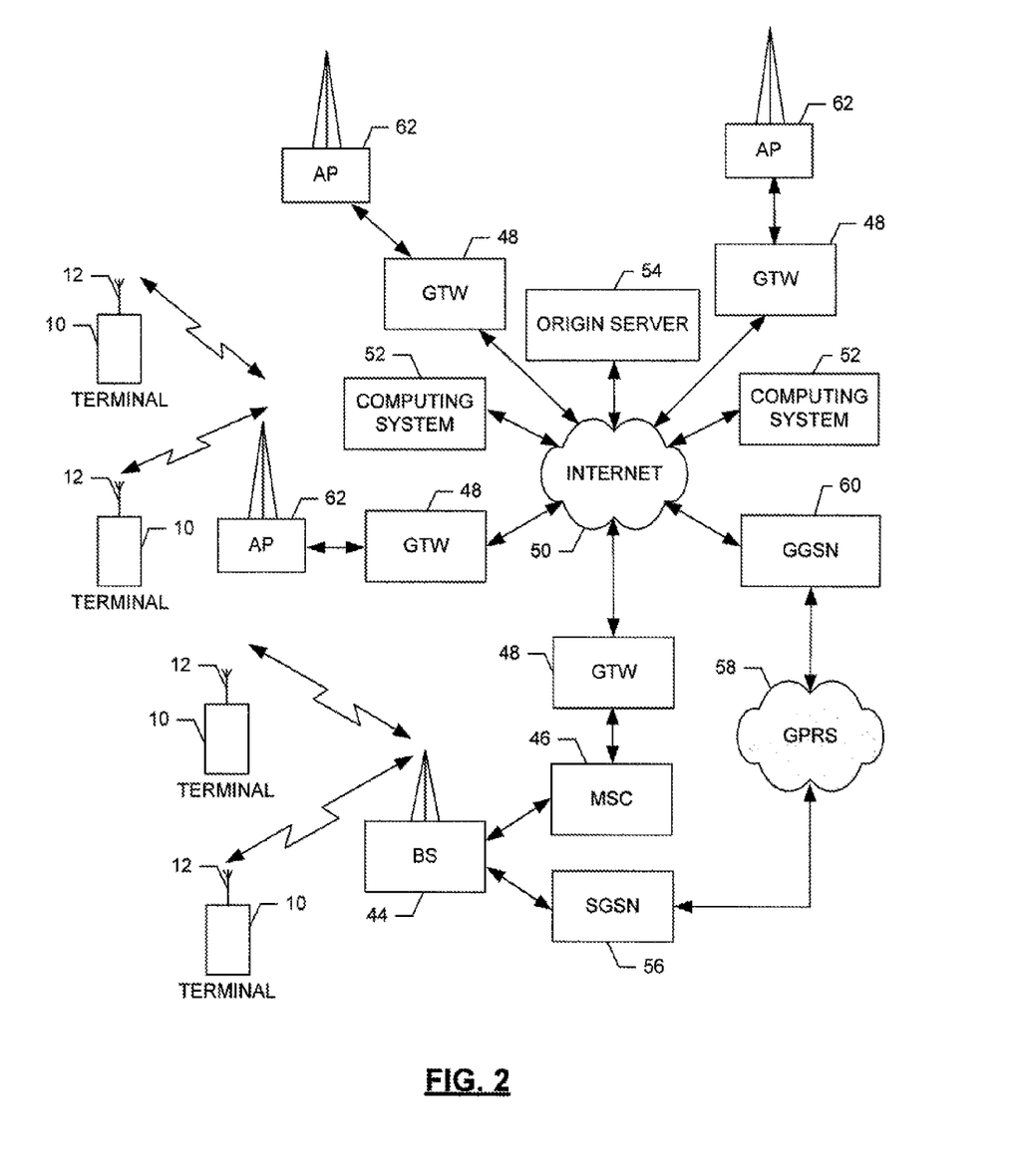
FIG. 2 is a schematic block diagram of one type of system in which embodiments of the present invention may be configured to operate, according to an exemplary embodiment of the present invention.

Referring now to FIG. 2, an illustration is provided of one type of system in which embodiments of the present invention may be configured to operate. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50.

The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

Figure 3:
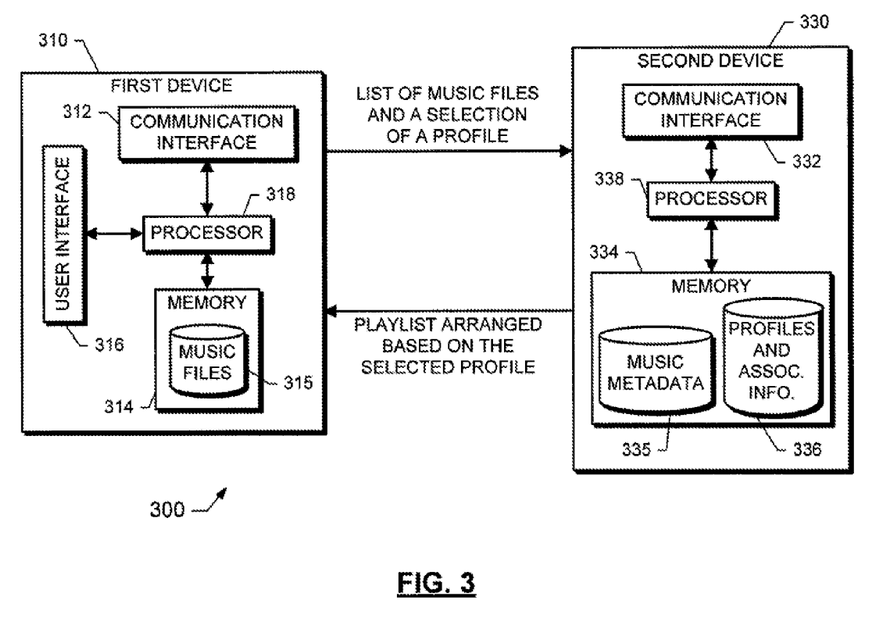
FIG. 3 is a schematic block diagram of a system for arranging a user's media files in accordance with an exemplary embodiment of the present invention.

Referring now to FIG. 3, a schematic block diagram is provided of a system 300 for generating an arrangement of a user's media files in accordance with one embodiment of the present invention. It should be noted that, although FIGS. 3-5 and the associated descriptions below generally describe a system configured for generating a playlist comprised of music stored in a user's device, other embodiments of the present invention may be configured to generate arrangements of any type of media file stored in the user's device, such as audio files, video files, digital images, text files, podcast files, and the like. In other words, a music file is an exemplary embodiment of a media file that may be manipulated by embodiments of the present invention.

As illustrated in FIG. 3, in an exemplary embodiment, the system includes a first device 310 and a second device 330 communicatively coupled to each other via a network or other communication system. In one embodiment, the first device 310 is a mobile terminal, such as the mobile terminal 10 described above with respect to FIG. 1. In another embodiment, the first device 310 may be a personal computer or other computing device. The second device 330 is also an electronic device and, in one embodiment, comprises a server communicatively coupled to a network, such as a web-server coupled to the Internet. In other embodiments, however, the second device 330 may be a mobile terminal, such as the mobile terminal 10 described above, or any other electronic device. In one embodiment, the network or communication system (not shown) coupling the two devices includes the Internet. As such, in one embodiment, the devices may be configured to communicate with each other using hypertext transfer protocol (HTTP) or any other communication protocol. In other embodiments, the communication system communicatively coupling the two devices may include some or all of the communication system described above with respect to FIG. 2.

In general, the first device 310 is configured to provide the second device 330 with a list of media files and selection of a profile. The second device 330 is then configured to arrange at least some of the music files identified in the received list into a playlist according to the selected profile. In one embodiment, the profile and associated information used to make the arrangement are stored in the second device 330. The second device 330 may then communicate the playlist back to the first device 310 so that the user of the first device 310 can play the music identified in the received playlist.

More particularly, the first device 310 generally includes a processor 318. Operably coupled to the processor 318 is a memory 314, the memory 314 having a plurality of music files (or other media files) stored therein. The memory 314 may also include computer-readable program instructions stored therein that can be executed by the processor 318 to perform certain predefined processes or process steps in the first device 310, such as the processes described below with reference to FIG. 5. The first device 310 may further include a user interface 316 operably coupled to the processor 318. The user interface 316 may be configured to receive input from a user and communicate the input to the processor 318. For example, the user interface 316 may include a touch screen, touchpad, microphone, mouse, joystick, keypad, and the like. The user interface 316 may also be configured to communicate output to a user based on signals received from the processor 318. For example, the first device 310 will typically include a display device and a speaker. The processor 318 may be configured to use the speaker to play the music 315 stored in the memory 314. The processor 316 may be configured to display visual information on the display device, such as textual metadata or other visual metadata associated with the music files 315 stored in the memory 314. Such metadata may include such information as a song's title, artist, album, genre, lyrics, and the like. The first device 312 may further include a communication interface 312 operably coupled to the processor 318 and configured to send and receive communications to and from other devices, such as the second device 330 or some other network device.

The second device 330 also typically includes means, such as a processor 338, for generating an arrangement, e.g., a playlist, of media files accessible by the first device. The processor 338 is operably coupled to means, such as a communication interface 332, for communicating with the first device and a memory 334. The communication interface 332 is configured to send and receive communications from other devices, such as the first device 310 or some other network device. The memory 334 is configured to store information therein that can be accessed by the processor 338. In this regard, the memory 334 may include computer-readable program instructions stored therein that are configured to be executed by the processor 338 to perform certain predefined processes or process steps in the second device 330, such as the processes described below with reference to FIG. 4. The memory 334 may also include a music metadata database or data store 335 and a profiles database or data store 336. These databases are described in greater detail below with reference to FIGS. 4 and 5.

Figure 4:
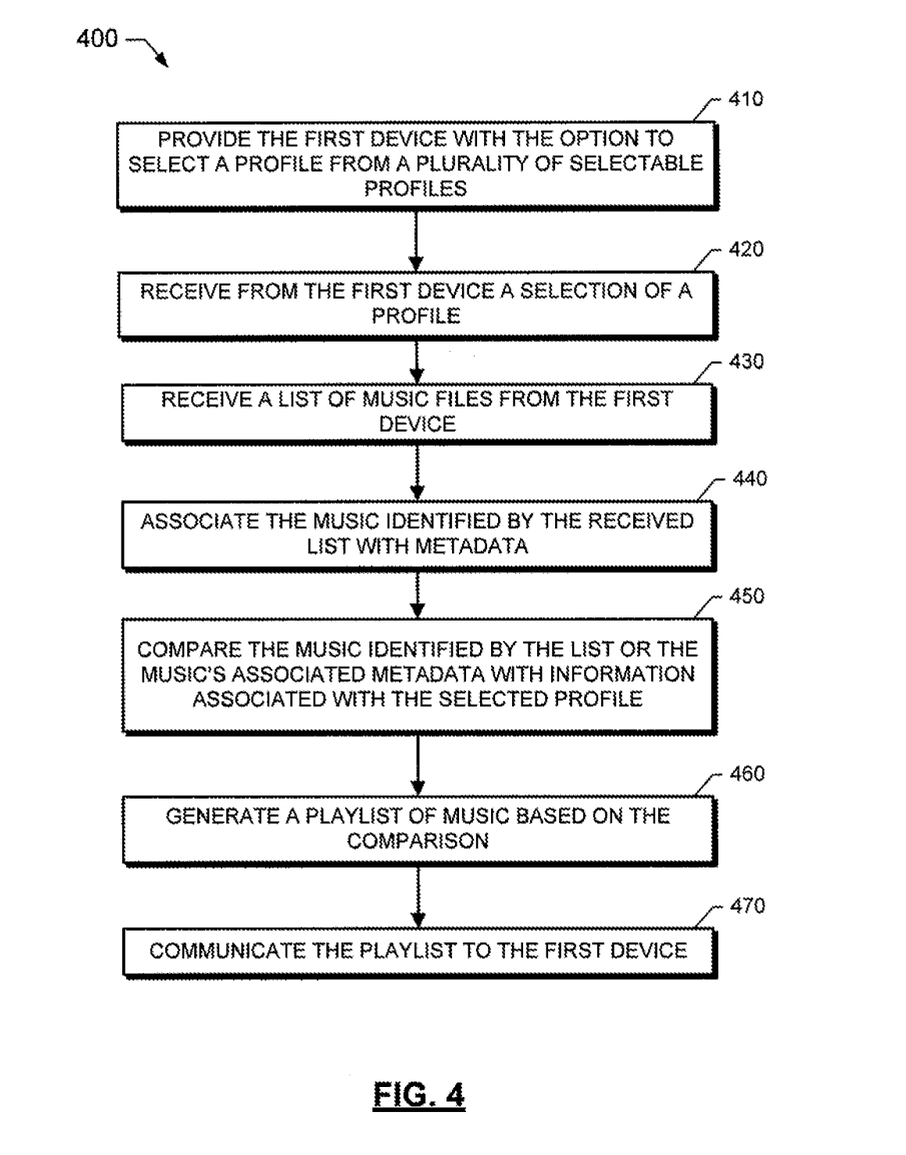
FIG. 4 is a flow diagram illustrating the process executed by the second device of FIG. 3, in accordance with an exemplary embodiment of the present invention.

FIG. 4 is a flow diagram illustrating a process 400 that may be executed by the second device 330 of FIG. 3 in accordance with an exemplary embodiment of the present invention. As illustrated by block 410, the second device 330 may provide the first device 310 with the option to select a profile from a plurality of selectable profiles. For example, the first device 310 may access the second device 330 via a communication network, such as the Internet. The second device 330 may then use its communication interface 332 to provide the first device 310 with an option to select one of a plurality of profiles by, for example, sending a list of the profiles to the first device 310 so that the first device 310 can display the list on its display device. In one embodiment, the second device 330 hosts a web page and communicates with the first device 310 using the web page. In such an embodiment, the second device 330 may display a list of available profiles on one or more web pages.

In this regard, the second device 330 will generally have a plurality of predefined profiles 336 stored in a memory 334. As used herein, a "profile" may include a predefined set of rules and/or other information that can be used by the processor 338 to select music that corresponds to a certain theme and/or to a certain person's preferences. For example, in one embodiment, a profile is generated for a particular celebrity and therefore has rules and/or other information that can be used by the processor 338 (e.g., when executing computer-readable program instructions) to select music that the celebrity may prefer or otherwise choose to listen to in a given situation. In one embodiment, the profile may further include information about the order in which selected music should be played. In other embodiments, a profile may be generated for a particular theme or mood. For example, a profile that is configured to help the processor 338 select music that corresponds to particular mood may be configured to help the processor select music that is sad, happy, angry, lazy, aggressive, or is commonly associated with any other type of mood. A profile that is configured to help the processor 338 select music that corresponds to a particular theme may be configured to help the processor select music that is commonly played at a party for 20-30 year olds, a nightclub, a wedding reception, a wedding ceremony, a gym, a child's birthday party, or on a lazy Sunday morning. In other words, profiles may be generated to help the processor 338 select music that is commonly associated with any type of event, occasion, purpose, or audience. In other embodiments, the profile may be configured for a combination of a particular person and a mood or theme. In such an embodiment, the profile would be configured to help the processor 338 select an arrangement of music that would correspond to music that may be selected by the particular person when that person is in a particular mood or is selecting music for a particular theme. Thus, a user of the first device 310 who has a large collection of music files stored in a memory 314 can access the second device 330 and have the second device 330 generate an appropriate playlist of the user's music. At the request of the user, the second device 330 may tailor the playlist to some event that the user is planning. In another example, if the user is a fan of a particular celebrity, the second device 330 may tailor the playlist to correspond to music that the celebrity may listen to in a given situation or mood.

Returning again to FIG. 4, as illustrated by block 420, the second device 330 may receive an indication from the first device 310 of a user's selection of a profile. The second device 330 may receive this selection via the communication interface 332 and communicate it to the processor 338.

As illustrated by block 430, the second device 330 may also receive a list of music files from the first device 310. In an exemplary embodiment, the list of music files identifies a plurality of music files stored within a memory 314 of the first device 310. Such a list may include the media files themselves; however, in a preferred embodiment, the list merely identifies the files by some sort of file title or other metadata associated with the files. For example, the list may comprise a list of the file names, the titles, artists, or albums associated with the music file, a portion of the recording or the lyrics, and/or any other information that may be used to identify the contents of the media files stored on the first device 310. In one embodiment, the user of the first device 310 uses the user interface 316 to instruct the processor 318 to generate a list of music files and to communicate the list to the second device 330. In other embodiments, however, the second device 330 may be configured to automatically interact with the first device 310 to obtain an indication of the media files 315 stored in the memory 314 of the first device 310. For example, the second device 330 may be configured to access a shared folder on the memory 314 of the first device 310, the shared folder containing the music files of the first device 310.

In some embodiments, the first device 310 communicates a list of all its music files to the second device 330. In other embodiments, however, the first device 310 may communicate a list of only a portion of its music files. For example, the second device 330 may be configured to store a list of a user's files (such as the first device user's files stored on the first device 310) under a user profile. In such an embodiment, the first device 310 may be configured to communicate a list of only any new files acquired by the user since the last time the user sent a list of music files to the second device 330. In this way, bandwidth may be saved when communicating with the second device 330. The second device 330 may then consolidate the received list with the earlier stored information, e.g. by deleting some file entries and adding files to the list communicated of the first device 310. Furthermore, where the second device 330 is configured to store the music files received from the first device 310 (or to store a list of the music files identified by the first device) the first device 310 may only need to communicate to the second device 330 a request to generate a new playlist on subsequent playlist generation requests.

In the exemplary embodiment of FIG. 4, after the second device 330 receives the list of music from the first device 310, the second device 330 may then associate the music identified in the list with predefined metadata or a predefined identifier. For example, in one embodiment, the first device 310 provides a list of music in the form of the titles of the music files stored in the first device's memory 315. File names for music files typically include the song title; however, the song title may be misspelled, incorrect, or missing from the file name since file names are often customized by the user. As such, it may be difficult to identify songs in the list since the same song may be saved under different file names by different users or even by the same user. Thus, before the second device 330 begins the process of generating a playlist, the second device 330 may need to first attempt to identify the music that is identified in the received list. In one embodiment, the second device 330 is configured to identify music from the list using the processor 338 to compare entries in the received list to entries in a music metadata database 335 stored in the second device's memory 334. The music metadata database 335 may include entries for each of a plurality of songs or other recordings and may have a plurality of alternate titles that may be associated with each song or recording. In this way, the processor 338 may take an entry from the received list of music and try to match the entry to one of the alternate titles in the database 335. In addition to or as an alternative to using such a database, the second device 330 may have an algorithm, typically embodied in software executed by the processor 338, used to identify the most likely song that an entry in the list corresponds to. For example, such an algorithm may be configured to identify a song title despite minor misspellings or variations in the title. Once an entry from the received list is identified as corresponding to a particular known song or other recording, the second device 330 may associate a new identifier to the list entry, the new identifier being one that is known by the second device as corresponding to a certain song or recording. Such an identifier may be text-based, such as a song title, or such an identifier may include a numeric or alphanumeric code that corresponds to a known song or recording.

In addition to identifying the entries in the music list, the second device 330 may also be configured to associate metadata with each list entry. In this regard, the music metadata database 335 may include a database of songs and other recordings along with metadata associated with each song or other recording. Such metadata may include information such as song titles, artist information, album information, year of release, year of production, genre, movies that the song was played in, and the like. Such metadata may also include one or more attributes assigned to each song in the database. For example, an attribute may be a feeling, mood, event, audience, or theme often associated with the song or other recording, or an attribute may be any other information that is commonly used to describe the song or is commonly associated with the song. The second device 330 may be configured to compare the entries in the received list to the music metadata database 335 to assign music metadata to the entries. As described below, this metadata may be useful when the second device 330 is selecting songs from the list in accordance with a predefined profile.

In other embodiments of the present invention, the list of music files may already include several items of metadata associated with each music file identified in the list. For example, the music files stored in the first device 310 may each be associated with such metadata as the song title, the artist, the album, the year, and/or the genre. The metadata may be associated with a media file using, for example, an ID3 tag format or the like. As such, the list sent to the second device 330 may include some or all of the metadata associated with the music files identified by the list. Thus, in some embodiments, the process illustrated by block 440 may be eliminated, since, in some embodiments, the list of music files may include enough metadata information that will allow the second device 330 to select music files from the list to use in a playlist.

Returning to FIG. 4, as illustrated by block 450, the second device 330 may be configured to compare music identified in the received list and/or the music's associated metadata (e.g., metadata included in the list or associated with a list entry by the second device 330, as described above with regard to block 440) with information associated with the selected profile. In this regard, the second device 330 may have a database 336 of profiles and associated information stored in a memory 334. The second device 330 may be configured to associate an entry (e.g., a song) from the received list with a selected profile by comparing the list entry and any of the entry's associated metadata with entries in the profile database 336 and any metadata associated with the database entries. For example, the profiles database 336 may include entries for a plurality of different profiles, such as a plurality of different celebrity profiles and/or a plurality of different theme profiles. Each profile may include music metadata associated with the profile that the processor can use to select music.

In one embodiment, each profile in the database 336 has a list of songs associated with the profile. The processor 338 of the second device 330 may then be configured to compare the songs identified by the list received from the first device 310 with the songs identified in the list associated with the selected profile in the profiles database 336. The processor 338 may be configured to identify any songs that are in both lists and use such songs to generate a playlist, as illustrated by block 460 of FIG. 4. In one embodiment, the user of the first device 310 can indicate to the second device 330 that the playlist generated by the second device 330 should not exceed a specified length or should not exceed a specified number of songs. In such an embodiment, the songs associated with the profiles database 336 may be ranked based on their relevance to the profile's theme or on the profile person's preferences, as the case may be. The second device 330 may then be configured to select only the highest ranked songs from the list if the list contains more relevant songs than are needed to fill a playlist of the specified length or number of files.

In one embodiment, even if a song from the received list does not match a song associated with the selected profile, the second device 330 may be configured to select the song from the received list based on other song metadata. For example, a profile may have a particular artist or album associated with it or may have a plurality of songs associated with it that are all from the same artist or album. In such an embodiment, the second device 330 may be configured to select songs from the received list that are associated with the same artist or album.

For example, in an exemplary embodiment where the profile is configured to be used to select music that a particular famous athlete may listen to during a workout, the profile database 336 may include a list of the songs, artists, and/or albums that the athlete prefers to listen to when exercising at the gym. The profiles database may also include a list of song attributes that the athlete looks for in a song when the athlete is exercising at the gym. For example, an athlete may choose to workout to a song that has a "fast" beat or to a song that is considered to have an "intense" tone or is considered by the athlete or by people in general to be "motivational" or "a good workout song." A song may then be selected by the second device 330 for the playlist if the music metadata database 335 associates any of these attributes to the song. Such a list of songs, attributes, or other music metadata associated with a celebrity profile may be generated by the celebrity or may be generated by someone else based on knowledge of the celebrity's preferences.

It should be noted that, just as a profile stored in the profiles database 336 may be associated with a list of songs and/or attributes that a particular person prefers or that are commonly associated with a particular theme or mood, a profile may also be associated with a list of songs and/or attributes that a particular person specifically does not like or that is commonly not associated with a particular theme or mood. For example, to return to the example of a profile associated with a famous athlete's preferred workout music, the profiles database 336 may indicate that the processor 338 should not select songs from the list that are considered "romantic ballads" if the athlete does not like to workout to songs identified as such.

By comparing the music identified by the received list or the music's associated metadata to music or metadata associated with the selected profile, the processor 338 of the second device 330 can select music from the received list to use in a playlist, as illustrated by block 460 of FIG. 4. In one embodiment, the processor 338 randomly orders the selected songs in the playlist. In other embodiments, however, the processor 338 may order the songs based on predefined rules and/or on information associated with the selected profile. For example, where the selected profile includes a list of songs, the selected profile may specify a preferred order such that the processor 338 orders the selected songs in the order in which they appear in the playlist. In other embodiments, the order may be based on a rank associated with the song or its relevance to the selected profile based on the number or type of metadata correlations between the listed media file and the profile. In some cases, ordering rules may specify an order based on attributes associated with the selected songs. For example, if the selected profile is one that is intended to generate a playlist for a party, the profile may include a rule that instructs the processor 338 to place songs at the end of the playlist if the song has metadata associated with it that indicates the song as a "good party ending song." Alternatively, the profile may include lists of beginning party songs, middle party songs, and ending party songs and the processor may order the playlist accordingly.

As illustrated by block 470 in FIG. 4, the second device 330 may be configured to use the communication interface 330 to communicate the playlist to the first device 310. The second device 330 may be configured to communicate the playlist via a web page, e-mail, Short Message Service (SMS), or any other communication means. Since, in the preferred embodiment, the playlist only includes music selected from the list of music files stored in the memory 314 of the first device 310, the playlist is generally only a list of music file identifiers that the first device 310 and/or the first device's user can recognize.

Figure 5:
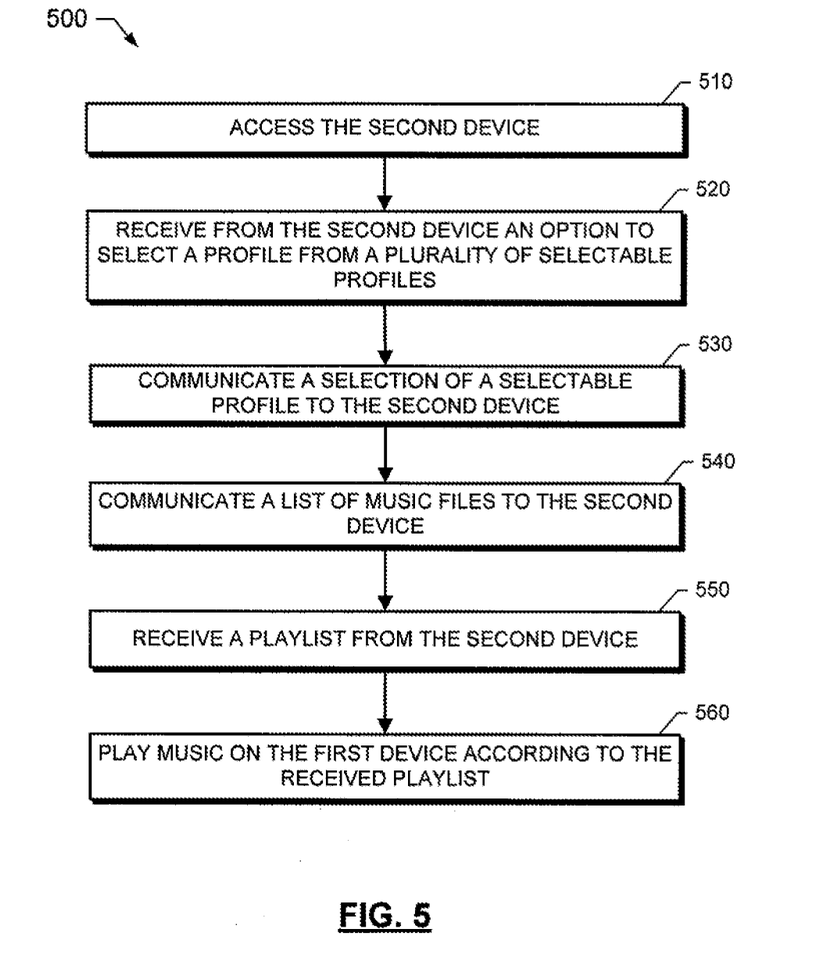
FIG. 5 is a flow diagram illustrating the process executed by the first device of FIG. 3, in accordance with an exemplary embodiment of the present invention.

Referring now to FIG. 5, a flow diagram is provided illustrating a process 500 that may be executed by the first device 310 of FIG. 3, in accordance with an exemplary embodiment of the present invention. In this regard, block 510 illustrates that the first device 310 may initially access the second device 330. For example, the first device 310 may use its communication interface 312 to access a web page hosted on the Internet by the second device 330. As illustrated by block 520, the first device 310 may receive from the second device 330 an option to select a profile from a plurality of selectable profiles. For example, the first device 310 may receive a list of profiles stored in a memory 334 of the second device 330, and the first device 310 may display this list for the user on a display device of the user interface 316. In one embodiment, the second device may host a web page that allows a user to search for profiles amongst a profiles database 336 stored in the memory 334, for example, by keyword searching.

As illustrated by block 530, the first device may use its communication interface 312 to communicate a selection of one of the profiles offered by the second device 330. For example, the user of the first device may actuate a user input device of the user interface 316 to select a profile and communicate the selected profile to the second device 330.

As illustrated by block 540, the first device may also communicate a list of music files to the second device 330. As described above, the list communicated to the second device may not actually contain any actual music files, but may only contain indications, such as music file names, of music files stored in the memory 314 of the first device 310. In one embodiment, the user of the first device 310 uses a user input device to select the music files that the user desires to communicate to the second device 330; however, as also described above, in another embodiment the first device 310 may provide the second device 330 with access to a shared folder in the first device's memory 314 so that the second device 330 can see any music files contained within the folder. In one embodiment, the user of the first device 310 may communicate a list of all music files stored in the first device 310, while in other embodiments, the user may select only some of the music files. The first device 310 may be configured to communicate a list of only some of the music files by communicating only files with of a certain file type (e.g., .mp3 files, .wav files, etc.), with certain metadata (e.g., files containing songs of a particular genre, time period, artist, album, or the like), or contained in a particular selected folder or subfolder.

Although not illustrated in FIG. 5, the user of the first device 310 may also communicate other information to the second device about the playlist that the user would like to receive in return. For example, the user of the first device 310 may specify that the playlist should not exceed a certain length of time or a certain number of songs. In another example, the user of the first device 310 may specify the manner with which the second device 330 should communicate the playlist to the first device 310.

As illustrated by block 550, the first device 310 eventually receives a playlist from the second device 330. The first device 310 may then store this playlist in the memory 314 and may be configured to play the music files 315 stored in the memory 314 in accordance with the received playlist, as illustrated by block 560.

It should be noted that FIGS. 4 and 5 represent exemplary embodiments of the present invention and that in other embodiments of the invention one or more of the steps or processes associated with blocks 410-470 and 510-560 may be considered optional or may be performed in an order other than that illustrated in FIGS. 4 and 5. For example, in FIG. 5, the first device 310 may communicate the list of music files to the second device before, after, or contemporaneous with the communication of the selection of a profile.

Although the figures described herein generally illustrate an embodiment of the present invention where the second device 330 creates a playlist using music files identified by the first device 310, in other embodiments of the invention the second device 330 may generate a playlist that identifies one or more songs or files not identified by the first device 310. For example, the second device 330 may be configured to generate a playlist of recommended music that the user may want to purchase based on the music files identified by the first device 310. In this regard, the second device 330 may be configured to compare metadata associated with the music files identified in the received list of music files with metadata associated with music stored in a database of the second device 330. In this way, the second device 330 can select music that the user of the first device does not own that is similar to the user's music and/or to the selected profile. For example, in an exemplary embodiment, when the second device 330 provides the first device 310 with an arrangement of the music identified by first device 310, the second device 330 is further configured to provide the first device 310 with options to purchase music (or video) files that are similar to the music files identified by the first device 310 and/or associated with the selected profile.

In addition to or as an alternative to the embodiments described above, the first device 310 may communicate a request for a profile and the second device 330 may communicate the requested profile and metadata associated with the requested profile to the first device 310. The first device 310 may then be configured to generate a playlist using the profile and profile metadata received from the second device 330. For example, the first device 310 may, for example, obtain a celebrity's profile from the second device 330 and then use that profile to generate a playlist inside the first device 310.

In still another exemplary embodiment, the second device 330 may be, for example, a mobile terminal 10. The first device 310 may then be configured to use a peer-to-peer network, a local radio interface, or the like, to request a playlist from a second device 330. In such an embodiment, the user of the first device 310 may send a list of available music files to the second device 330 and request that the user of the second device 330 create a playlist using the files available to the user of the first device 310.

The functions described above with respect to the various embodiments of the present invention may be carried out in many ways. For example, any suitable means for carrying out each of the functions described above may be employed to carry out embodiments of the invention. According to one aspect of the present invention, all or a portion of the system generally operates under control of a computer program product. The computer program product for performing the various processes and operations of embodiments of the present invention includes a computer-readable storage medium, such as a non-volatile storage medium, and computer-readable program code portions, such as a series of computer instructions, embodied in the computer-readable storage medium. For example, in one embodiment, the processor of the second device generally operates under the control of a computer program product to execute an arrangement generating application in order to perform the various functions described above with reference to generating an arrangement of media files in accordance with a selected profile.

In this regard, FIGS. 3-5 are flowcharts or block diagrams of operations performed by methods, systems, devices, and computer program products according to embodiments of the present invention. It will be understood that each block of a flowchart or each step of a described method can be implemented by computer program instructions. These computer program instructions may be loaded onto a computer or other programmable apparatus to produce a machine, such that the instructions which execute on the computer or other programmable apparatus create means for implementing the functions specified in the described block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the described block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the described block(s) or step(s).

It will also be understood that each block or step of a described herein, and combinations of blocks or steps, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
causing provision of, from a second apparatus to a first apparatus, an option to select a profile from one or more selectable profiles associated with a user other than a user of the first apparatus, wherein the one or more selectable profiles each have respective associated one or more profile media file identifications stored in a media file database accessible by the second apparatus;
receiving, from the first apparatus, an indication of a selection of a profile from the one or more selectable profiles associated with the user other than the user of the first apparatus, and an indication of a particular mood of the user of the first apparatus;
receiving, from the first apparatus, a present list of a plurality of media file identifications stored in the first apparatus;
generating a playlist based on the present list of the plurality of the media file identifications and the one or more profile media file identifications associated with the selected profile, wherein generating the playlist comprises comparing one or more of the plurality of the media file identifications on the list with the one or more profile media file identifications associated with the selected profile stored in the media file database accessible by the second apparatus, and identified by the user other than the user of the first apparatus as preferred in an instance the user other the user of the first apparatus is in the particular mood, and selecting one or more media identifications which are on both the present list and in the one or more profile media file identifications stored on the media file database; and
causing communication of the playlist with the one or more selected media file identifications to the first apparatus, wherein the first apparatus is configured for identifying the one or more media files stored in the first apparatus for playing in accordance with the one or more selected media file identification received from the second apparatus.

2. The method of claim 1, wherein the second apparatus comprises at least a web server.

3. The method of claim 1, wherein the second apparatus hosts a web page and communicates with the first apparatus via the web page.

4. The method of claim 1, wherein a list of available profiles is provided via one or more web pages via the second apparatus.

5. The method of claim 1, wherein the second apparatus is configured to automatically interact with the first apparatus to access the present plurality of media file identifications.

6. The method of claim 1, wherein the selected profile comprises a predefined set of rules that can be processed by to select additional media files that correspond to at least one of a theme, mood or preferences.

7. The method of claim 1, wherein the selected profile comprises information about the order in which media files should be played.

8. The method of claim 1, wherein the media file identifications comprise metadata that describe the media files.

9. The method of claim 1, wherein the first apparatus is configured to use at least one of a peer-to-peer network or a local radio interface to request the playlist from the second apparatus.

10. A server apparatus comprising at least one processor and at least one memory including computer program code, the at least one memory and the computer program code configured to, with the processor, cause the server apparatus to at least:
provide to a first apparatus an option to select a profile from one or more selectable profiles associated with a user other than a user of the first apparatus, wherein the one or more selectable profiles each have respective associated one or more profile media file identifications stored in a media file database accessible by the second apparatus;
receive, from the first apparatus, an indication of a selection of a profile from the one or more selectable profiles associated with the user other than the user of the first apparatus;
receive, from the first apparatus, a present list of a plurality of media file identifications stored in the first apparatus, and an indication of a particular mood of the user of the first apparatus;
generate a playlist based on the present list of the plurality of the media file identifications and the one or more profile media file identifications associated with the selected profile, wherein generating the playlist comprises comparing one or more of the plurality of the media file identifications on the list with the one or more profile media file identifications associated with the selected profile stored in the media file database accessible by the server apparatus, and identified by the user other than the user of the first apparatus as preferred in an instance the user other the user of the first apparatus is in the particular mood, and selecting one or media identifications which are on both the present list and in the one or more profile media file identifications stored on the media file database; and
cause communication of the playlist with the one or more selected media file identifications to the first apparatus, wherein the first apparatus is configured for identifying the one or more media files stored in the first apparatus for playing in accordance with the one or more selected media file identification received from the server apparatus.

11. The server apparatus of claim 10, wherein the server apparatus comprises at least a web server.

12. The server apparatus of claim 10, wherein the server apparatus hosts a web page and communicates with the first apparatus via the web page.

13. The server apparatus of claim 10, wherein a list of available profiles is provided via one or more web pages via the server apparatus.

14. The server apparatus of claim 10, wherein the server apparatus is configured to automatically interact with the first apparatus to access the present plurality of media file identifications.

15. The server apparatus of claim 10, wherein the selected profile comprises a predefined set of rules that can be processed by to select additional media files that correspond to at least one of a theme, mood or preferences.

16. The server apparatus of claim 10, wherein the selected profile comprises information about the order in which media files should be played.

17. A method comprising:
communicating from a first apparatus to a second apparatus a request to generate a playlist based on a selected profile associated with a user other than a user of the first apparatus, wherein the one or more selectable profiles each have respective associated one or more profile media file identifications stored in a media file database accessible by the second apparatus;
receiving in the first apparatus, from the second apparatus, an option to select a profile from one or more of profiles associated with the user other than the user of the first apparatus;
communicating a selection of a profile from the one or more profiles, and an indication of a particular mood of the user of the first apparatus to the second apparatus;
communicating from the first apparatus a present list of a plurality of media file identifications stored in the first apparatus to the second apparatus;
receiving in the first apparatus the playlist generated based on the selected profile and the communicated list of the plurality of the media file identifications, wherein the playlist comprises one or more selected media file identifications which are on both the present list and in the one or more profile media file identifications stored on the media file database and are identified by the user other than the user of the first apparatus as preferred in an instance the user other the user of the first apparatus is in the particular mood; and
identifying the one or more media files stored in the first apparatus for playing in accordance with the one or more selected media file identifications received from the second apparatus.

18. An apparatus comprising at least one processor and at least one memory including computer program code, the at least one memory and the computer program code configured to, with the processor, cause the apparatus to at least:
communicate from a first device to a second device a request to generate a playlist based on a selected profile associated with a user other than a user of the first device, wherein the one or more selectable profiles each have respective associated one or more profile media file identifications stored in a media file database accessible by the second device;
receive in the first device, from the second device, an option to select a profile from one or more of profiles associated with the user other than the user of the first device;
communicate a selection of a profile from the one or more profiles, and an indication of a particular mood of the user of the first apparatus to the second device;
communicate from the first device a present list of a plurality of media file identifications stored in the first device to the second device;
receive in the first device the playlist generated based on the selected profile and the communicated list of the plurality of the media file identifications, wherein the playlist comprises one or more selected media file identifications which are on both the present list and in the one or more profile media file identifications stored on the media file database and are identified by the user other than the user of the first apparatus as preferred in an instance the user other the user of the first apparatus is in the particular mood; and identify the one or more media files stored in the first device for playing in accordance with the one or more selected media file identifications received from the second device.

* * * * *

UNITED STATES PATENT AND TRADEMARK OFFICE
CERTIFICATE OF CORRECTION

PATENT NO. : 9,977,783 B2
APPLICATION NO. : 15/426522
DATED : May 22, 2018
INVENTOR(S) : Hannu Konttinen It is certified that error appears in the above-identified patent and that said Letters Patent is hereby corrected as shown below:

On the Title Page

Column 1,
Item (*), in "Notice", Line 3, "0 days. days." should read --0 days.--.

In the Claims

Column 19,
Line 41, "one or" should read --one or more--.

Signed and Sealed this
Eighth Day of January, 2019

Andrei Iancu
*Director of the United States Patent and Trademark Office*